US010331992B2

(12) United States Patent
Steinmetz

(10) Patent No.: US 10,331,992 B2
(45) Date of Patent: Jun. 25, 2019

(54) ARCHED RADIO FREQUENCY IDENTIFICATION (RFID) DEVICES

(71) Applicant: Barcoding, Inc., Baltimore, MD (US)

(72) Inventor: Jay Steinmetz, Baltimore, MD (US)

(73) Assignee: Barcoding, Inc., Baltimore, MD (US)

( * ) Notice: Subject to any disclaimer, the term of this patent is extended or adjusted under 35 U.S.C. 154(b) by 0 days.

(21) Appl. No.: 15/786,678

(22) Filed: Oct. 18, 2017

(65) Prior Publication Data

US 2019/0114524 A1   Apr. 18, 2019

(51) Int. Cl.
*G06K 19/02* (2006.01)
*G06K 19/077* (2006.01)

(52) U.S. Cl.
CPC . *G06K 19/07722* (2013.01); *G06K 19/07758* (2013.01)

(58) Field of Classification Search
CPC .... G09F 3/005; G06K 19/067; G06K 19/077; G06K 19/07718; G06K 19/07749; G06K 19/0723; G06K 19/07794; G06K 19/07783; G06K 19/07754; G06K 19/07722; G06K 19/0775; G06K 19/07771; G06K 19/07773; G06K 19/07786; G06K 19/06028; G06K 19/07747; G06K 19/07758; G06K 19/07769; G06K 19/083; G06K 19/04; G06K 19/041; G06K 19/06018; G06K 19/06046; G06K 19/06187; G06K 19/0726; G06K 19/07327; G06K 19/07726; G06K 19/07752; G06K 19/07756; G06K 19/07762; G06K 19/07779; G06K 19/07788; G06K 19/07798; G06K 19/12; G06K 19/14; G07C 9/00111; G08B 13/2414; G08B 13/2417; G08B 13/2431; G08B 13/2434; G08B 13/2437; G08B 13/244; G08B 13/2442

See application file for complete search history.

(56) References Cited

U.S. PATENT DOCUMENTS

| 5,973,598 A * | 10/1999 | Beigel | G06K 19/067 |
| | | | 29/595 |
| 7,586,410 B2 | 9/2009 | Tsirline et al. | |
| 8,616,457 B2 | 12/2013 | Krawczewicz et al. | |
| 8,632,016 B2 | 1/2014 | Gunther | |
| 2011/0042933 A1 * | 2/2011 | Landsman | G09F 3/005 |
| | | | 283/70 |

(Continued)

*Primary Examiner* — Thien T Mai
(74) *Attorney, Agent, or Firm* — Occhiuti & Rohlicek LLP

(57) ABSTRACT

Disclosed are methods, devices, and other implementations, including a radio frequency identification (RFID) device that includes a sheet comprising a middle strip section separable from a remainder of the sheet, and two side strips flanking the separable middle strip section, with the middle strip section including an attachment structure. The RFID device further includes a radio frequency circuit configured to receive RF transmissions and to transmit reply RF signals. The middle strip section is initially attached to the two side strips in a non-separated configuration, and is configured to be partly separated from the two side strips flanking the middle strip section, and to be attached to at least one of the two side strips at a corresponding at least one attachment point such that the middle strip section, when attached, protrudes relative to a plane defined by the remainder of the sheet to form an arched structure.

18 Claims, 5 Drawing Sheets

(56) References Cited

U.S. PATENT DOCUMENTS

2011/0179686 A1* 7/2011 Morehouse ............ G09F 3/005
 40/633
2014/0239074 A1 8/2014 Wang

* cited by examiner

ARCHED RADIO FREQUENCY IDENTIFICATION (RFID) DEVICES

BACKGROUND

Radio Frequency identification (RFID) devices (tags) are frequently employed in tracking and inventory control applications. The use of such RFID devices allows for a quick identification of an asset or person that is associated with the tag (uniquely or non-uniquely). The ease and efficiency of tracking or identifying object and/or person associated with particular tags depends on the accessibility and/or visibility of such tags to RFID reading and sensing devices.

SUMMARY

In some variations, a radio frequency identification (RFID) device is provided that includes a sheet comprising a middle strip section separable from a remainder of the sheet, and two side strips flanking the separable middle strip section, with the middle strip section including an attachment structure. The RFID device further includes a radio frequency circuit configured to receive RF transmissions and to transmit reply RF signals responsive to the RF transmissions. The middle strip section is initially attached to the two side strips in a non-separated configuration, and is configured to be partly separated from the two side strips flanking the middle strip section, and to be attached to at least one of the two side strips at a corresponding at least one attachment point such that the middle strip section, when attached, protrudes relative to a plane defined by the remainder of the sheet comprising the two side strips to form an arched structure.

Embodiments of the RFID device may include at least some of the features described in the present disclosure, including one or more of the following features.

The middle strip section may be of a length longer than respective lengths of the two side strips, with the middle strip section including an end portion protruding past end portions of the two side strips when the middle strip is in the non-separated configuration, and with the attachment structure including one or more tabs extending transversely from the end portion of the middle strip section with the one or more tabs configured to be secured to the at least one of the two side strips at corresponding at least one attachment point when the middle strip section is partly separated from the two side strips.

The one or more tabs may include adhesive layers configured to adhere to the corresponding at least one attachment point on the at least one of the two side strips.

The at least one attachments point may include one or more notches to securely receive the one or more tabs of the middle strip section.

The middle strip section may be attached to the two side strips, in the non-separated configuration, at perforated edges separating different length sides of the middle strip section from respective length sides of the two side strips.

The middle strip section may be disposed in the non-separated configuration on an adhesive section of a substrate layer, with the middle strip section configured to be peeled when separated from the two side strips.

The RFID device may further include an attachment mechanism configured to couple the RFID device to another object.

The attachment mechanism may include at least one adhesive layer covering at least one underside surface of at least one of the two side strips.

The attachment mechanism may include a receiving structure mountable on the other object, the receiving structure configured to securely receive at least the two side strips.

The radio frequency circuit may include a communication module to receive and transmit RFID communications, a controller to process received data and transmitted data, and a power harvester to inductively generate electrical current or voltage from at least the received RFID communications to power at least the communication module and the controller.

In some variations, a method is provided that includes providing a radio frequency identification (RFID) device comprising a sheet including a middle strip section separable from a remainder of the sheet with the middle strip section including an attachment structure, two side strips flanking the separable middle strip section, and a radio frequency circuit configured to receive RF transmissions and to transmit reply RF signals responsive to the RF transmissions, with the middle strip section being initially attached to the two side strips in a non-separated configuration. The method further includes partly separating the middle strip section from two side strips flanking the middle strip section, and attaching the partly separated middle strip section to at least one of the two side strips at a corresponding at least one attachment point such that upon attaching the middle strip section, the attached middle strip section forms an arched structure protruding relative to a plane defined by the remainder of the sheet comprising the two side strips.

Embodiments of the method may include at least some of the features described in the present disclosure, including at least some of the features described above in relation to the RFID device, as well as one or more of the following features.

The middle strip section may be of a length longer than respective lengths of the two side strips, with the middle strip section comprising an end portion protruding past end portions of the two side strips when the middle strip is in a non-separated configuration. Attaching the partly separated middle strip section to the at least one of the two side strips may include attaching one or more tabs extending transversely from the end portion of the middle strip section to the at least one of the two side strips at the corresponding at least one attachment point.

Attaching the partly separated middle strip section to the at least one of the two side strips at the corresponding at least one attachment point may include receiving at one or more notches located at the at least one of the two side strips the one or more tabs of the middle strip section.

The middle strip section may be attached to the two side strips, in the non-separated configuration, at perforated edges separating different length sides of the middle strip section from respective length sides of the two side strips.

The middle strip section may be disposed in the non-separated configuration on an adhesive section of a substrate layer. Partly separating the middle strip section from two side strips may include peeling the middle strip section from the adhesive section of the substrate layer.

The method may further include attaching the RFID device to another object.

Attaching the RFID device to the other object may include exposing at least one adhesive layer covering at least one underside surface of at least one of the two side strips, and securing the exposed at least adhesive layer to a surface of the other object.

Attaching the RFID device to the other object may include placing at least the two side strips in a receiving structure mountable on the other object.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Disclosed herein are methods, systems, devices, media, and other implementations for an arched RFID device (tag) that protrudes from a plane of a surface on which the RFID tag (e.g., a base structure of the tag) is mounted or secured to. In some embodiments, such an RFID device may include a sheet comprising a middle strip section separable from a remainder of the sheet and multiple (e.g., two) side strips flanking the separable middle strip section, with the middle strip section including an attachment structure. The RFID device further includes a radio frequency circuit configured to receive RF transmissions and to transmit reply RF signals responsive to the RF transmissions. The middle strip section is initially attached to the two side strips in a non-separated configuration, and is configured to be partly separated (e.g., through perforations along which the middle strip section can be torn, by way of an adhesive layer underlying the middle strip section from which the middle strip section can be peeled away, etc.) from the two side strips flanking the middle strip section, and to be attached to at least one of the two side strips at a corresponding at least one attachment point such that the middle strip section, when attached, protrudes relative to a plane defined by the remainder of the sheet, comprising the two side strips, to form an arched structure. The protruding arched section raises the RFID circuit disposed on the arched structure so that it is more visible/accessible to RFID readers with which the RFID circuit can communicate or otherwise interact, and further reduces electromagnetic interference that may have been caused had the RFID circuit was nearer to the surface of the object to which the RFID device is secured.

Figure 1A:
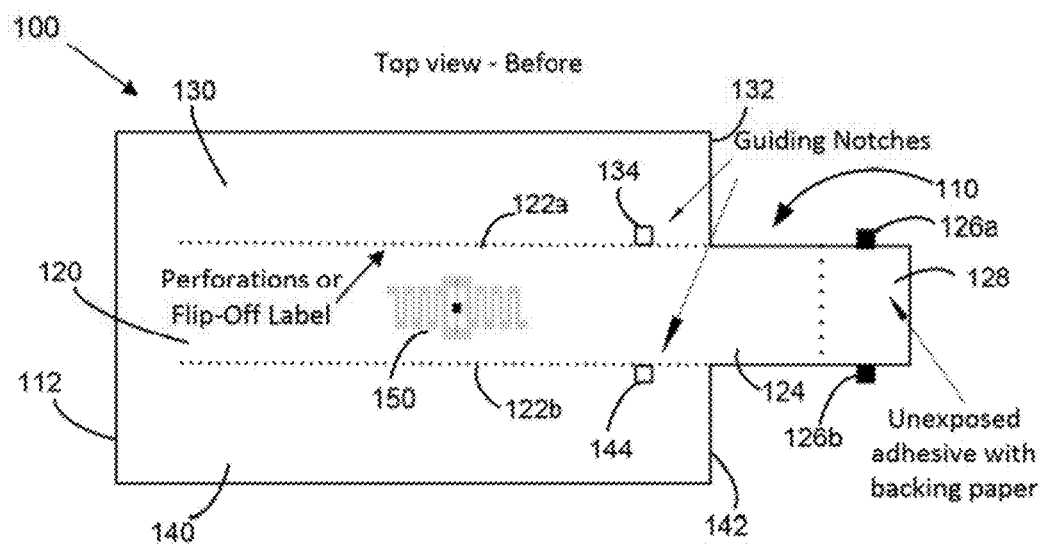
FIGS. 1A and 1B are a top and side views of an unformed RFID structure configured to be transformed into an arched structure.
Figure 1B:
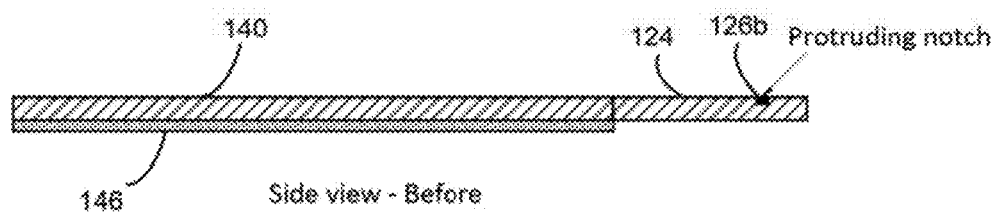

More particularly, FIGS. 1A and 1B are a top and side views of an unformed (un-assembled) RFID device (structure) 100 configured to be erected/transformed into an arched structure, in a manner that will be described in greater detail below. The RFID device 100, prior to being transformed into its protruding formation, includes a sheet 110 (generally a substantially flat sheet) comprising a middle strip section 120 separable, at least partly, from a remainder of the sheet 110. The middle strip section 120 may be separable from the remainder of the sheet 110 via, for example, perforations 122a and 122b, that allow the middle strip section 120 to be separated/torn along such perforations 122a and 122b. Additionally or alternatively, in some embodiments the middle strip section 120 may be separable from the remainder of the sheet 110 by peeling an outer layer of the middle strip section from an underlying adhesive layer. In such embodiments, the adhesive layer and the outer layer may have dimensions defining the middle strip section 120.

As further shown in FIG. 1A, the middle strip section 120 is flanked by two side strips 130 and 140 (more strips may be defined on the sheet). The middle strip section 120 is initially attached to the two side strips 130 and 140 in a non-separated configuration, and is configured to be partly separated from the two side strips flanking the middle strip section (e.g., by tearing along perforations, when such perforations are provided, by peeling a cover/outer layer of the middle strip section from an underlying adhesive layer, etc.), and to be attached to at least one of the two side strips at a corresponding at least one attachment point (depicted as attachment points 134 and 144 in FIG. 1A) such that the middle strip section, when attached, protrudes relative to a plane defined by the remainder of the sheet comprising the two side strips to form an arched structure.

In some embodiments, the middle strip section 120 may be of a length longer than respective lengths of the two side strips 130 and 140, and may include an end portion 124 protruding past end edges 132 and 142 of the two side strips 130 and 140, respectively, when the middle strip is in a non-separated configuration. The attachment structure may include one or more tabs (e.g., two tabs 126a and 126b in the example of FIG. 1A) extending transversely from the end portion of the middle strip section 120 with the one or more tabs 126a and 126b configured to be secured to the at least one of the two side strips at the corresponding at least one attachment point when the middle strip section is partly separated from the two side strips. In the example of FIG. 1A, the tabs 126a and 126b attach to the flanking side strips 130 and 140 at the attachments points 134 and 144, respectively.

In some embodiments, the attachment points 134 and 144 may be notches configured to securely receive the tabs 126a and 126b of the middle strip section 120. Thus, to assemble the arched structure comprising the protruding middle strip section, the end portion 124 may be folded (e.g., along a transverse line extending perpendicularly between the longitudinal sides of the end portion 124), with the tabs 126a 126b fitted into the respective notches 134 and 144. Alternatively or additionally, the end portion 124 of the middle strip section 120 may include a multi-layered end section 128 comprising a peelable cover, and an underlying adhesive section (in some embodiments, the tabs 126a and 126 maybe similarly structured as a multi-layered structure that includes an underlying adhesive layer and a peelable cover layer). An example of an adhesive material that may be used to implement the adhesive layer used with the RFID device 100 includes wax, cyanoacrylate adhesive, epoxy adhesive, structural acrylic adhesive, etc. In such embodiments, upon removal of the peelable cover layer, the adhesive of the adhesive layer is exposed, and the end section 128 is folded along the chosen transverse line in the end portion 124 so that the portion with the adhesive materials partly covers the partly separated middle strip section 124, and is secured to the flanking side strips using the exposed adhesive material. The folding action of the end portion 124, and the positioning of the end section 128 over the flanking side strip bends/warps the middle strip section 120 into an arched structure, thus resulting in the protruding formation of the middle strip section 120. As noted, the use of the adhesive material at the end section 128 may be done in addition to the fitting of the tabs 126a and 126b into the notches 134 and 144 so that the end section 128 is more reliably secured to the attachments points on the flanking side strips. Fitting the tabs 126a and 126b into the notches 134 and 144, and/or using the adhesive material at the end section 128 also helps to keep the strips aligned.

As noted, in some embodiments, the middle strip section 120 may be attached (e.g., along its longitudinal sides) to the two side strips 130 and 140, when it is still in the non-separated configuration, at perforated edges 122a and 122b defining boundaries between the middle strip section 120 and the two side strips 130 and 140. The perforation 122a and 122b generally do not (but can) extend all the way to end side 112 of the sheet 110. Thus, when forming the arched RFID device (from the substantially flattened sheet 110), the middle strip section 120 is partly separated (ripped away) from the flanking side strips along the perforations, leaving a portion proximate the side 112 where the middle strip section 120 and the two flanking sides are attached. The separated middle strip portion can then be bent/folded and, using the attachment mechanism (e.g., the notch/tab configuration and/or the adhesive layer in the end portion 124) and re-secured to the flanking sides in a way that the middle strip section 120 protrudes as an arched section. In some embodiments, the middle strip section 120 may also include one or more pre-designated fold locations to allow further adjustments to the arched configuration of the RFID device. For example, the pre-designated fold locations can be used to manipulate (cause) the arched formation to have, for example, a rectangular or bow structure, thus allowing some level of control over the characteristics of the resulting antenna for the RFID device. For instance, a rounded antenna that bows out may operate differently than an antenna that has a more rectangular shape.

As also noted, in some embodiments, a cover layer of the middle strip section 120 may be disposed, in the non-separated configuration, on an adhesive section of a substrate layer, with the cover layer of the middle strip section 120 configured to be peeled when separated from the two side strips. The end portion 124 may separately have another, different, multi-layered structure where a tip of the end portion 124 may be peeled to expose an adhesive layer that can be secured, when the middle strip section 120 is bent/folded, to the flanking side strips.

The RFID device (whether in its non-separated configuration, where it is arranged as a substantially flat sheet that includes a separable middle section, or in its formed arched configuration) may further include an attachment mechanism configured to couple the RFID device to another object. For example, and as illustrated in FIG. 1B (showing the side view of the RFID device 100), the attachment mechanism may include at least one adhesive layer 146 constituting a bottom layer of the side strip 140 (a similar layer may be included as the bottom layer of the side strip 130). The adhesive layer 146 may comprise a cover layer and adhesive material that is exposed upon removal of the cover layer. In such embodiments, prior to or after separating the middle strip section 120 from the remainder of the sheet 110, the adhesive material is exposed (e.g., by removing the cover layer, if one is used), and securing at least the side strips 130 and 140 to a surface of a target object (an asset to be tracked, a clothing item of a person to which the RFID device 100 is to be secured, etc.) In embodiments in which the middle strip section 120 is separated from the remainder of the sheet 110 by peeling away an outer layer from an adhesive layer, the attachment mechanism may be structured so that a further layer disposed beneath the adhesive layer (to which the cover layer of the middle strip section 120 peeled away was secured) includes a cover protecting a further adhesive layer. In such embodiments, an entire rectangular bottom surface, corresponding to the bottom surface area of the middle strip section 120 and the side strips 130 and 140 would be available to be secured to the surface of the target object to which the RFID device 110 is to be secured. Alternatively, if the middle strip section 120 is separated by tearing it away from the side strips 130 and 140 through perforations, a space, defined by the remaining side strips 130 and 140 where the middle strip section 120 was prior to its detachment from the side strips, is formed. In some embodiments, the RFID device 100 may be mounted or attached to the target object by placing at least the side strips 130 and 140 in a receiving structure, such as a pocket (mounted on the target object) to receive the side strips, or tracks that slidably receive the side strips 130 and 140.

As schematically illustrated in FIG. 1A, the RFID device 100 includes a radio frequency circuit 150 disposed on the outer surface of the middle strip section 120 of the RFID device 100. The RF circuit 100 may be implemented as a transponder die. The radio frequency circuit 150 is generally positioned at a location on the middle strip section 120 that when the middle strip section 120 is separated from the remainder of the sheet 110 and an arch is formed, the RF circuit 150 will at a position that is the farthest, or nearly farthest from the plane defined by the remainder of the sheet 110. In some embodiments, the RF circuit 110 is configured to receive RF transmissions (e.g., from an RFID reader) and to transmit (e.g., back to the RFID reader) reply RF signals responsive to the RF transmissions. As will be discussed in greater detail below in relation to FIGS. 3 and 4, the radio frequency circuit 150 may include a communication module to receive and transmit RFID communications, a controller to process received data and data to be transmitted, and a power source. The RFID device may be an active device that include a power supply such as a battery or a voltage regulator connected to an external source. Alternatively, the RFID device may be a passive RFID device that does not require a power supply (e.g., a battery or an external power supply) to operate the device's circuits, but instead implements a power harvester to inductively generate electrical current or voltage from at least the received RFID communications (or from ambient RF transmissions) to power at least the communication module and the controller. Generally, a power harvester may include a rectifier configured to generate DC power output from inductively generated AC electrical current or voltage, for storage on a storage device (e.g., a chargeable battery or capacitor). A regulator (e.g., low-dropout, or LDO, regulator) may be used to provide controlled voltage or current level to the various load units of the RFID device (such as the RFID device 100), including the communication module of the RFID device and the controller (e.g., a processor-based controller).

In some embodiments, the communication module of the RF circuit may be configured to receive and process signals in at least one frequency band (e.g., UHF band), and transmit signals (which may be in the same or different frequency as the received signals) comprising, for example, identification data (e.g., an identifier) associated with the RFID device 100 (the identifier may be some unique identification number or value that was pre-stored on a non-volatile memory device of the RFID device 100). Other types of data may also be transmitted by the RFID device 100. The communication module may include an antenna element, which may be configured or structured to receive and/or transmit signals for a particular RF frequency bands (such as UHF), with the antenna element being coupled to a demodulator configured to process received wireless signals to, for example, extract or read data modulated or encoded on the received wireless signals. For example, the demodulator, in conjunction with a controller (which may be a processor-based controller), may be configured to identify signals transmitted by a reader device in communication with the RFID device to trigger or cause the RFID device to respond with the reply wireless signal. The communication module may additionally include a modulator (which may be implemented using the same or different circuitry as the demodulator), electrically coupled to the controller and the antenna element, to generate RF reply signals for transmission. The modulator may thus be configured to generate a signal with particular RF characteristics (e.g., carrier frequency, phase, amplitude, etc.) and to encode or modulate data (e.g., identification data, sensor data, etc.) onto the reply signal to be transmitted.

Figure 2A:
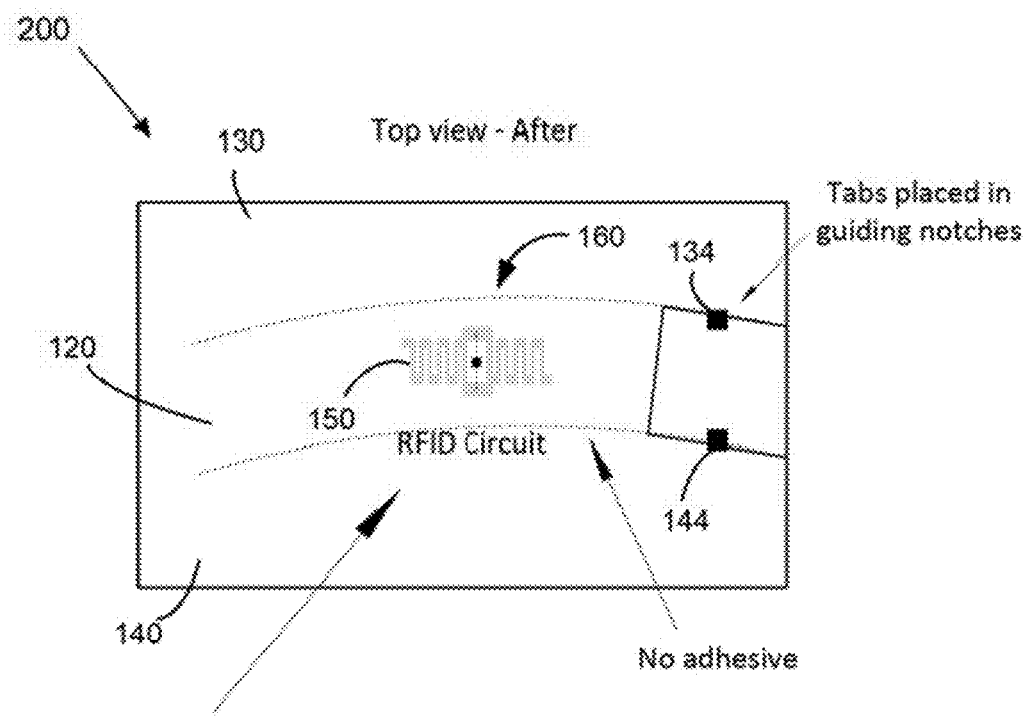
FIGS. 2A and 2B are a top and side views of an arched RFID device, formed from the substantially flattened RFID device of FIGS. 1A-B.
Figure 2B:
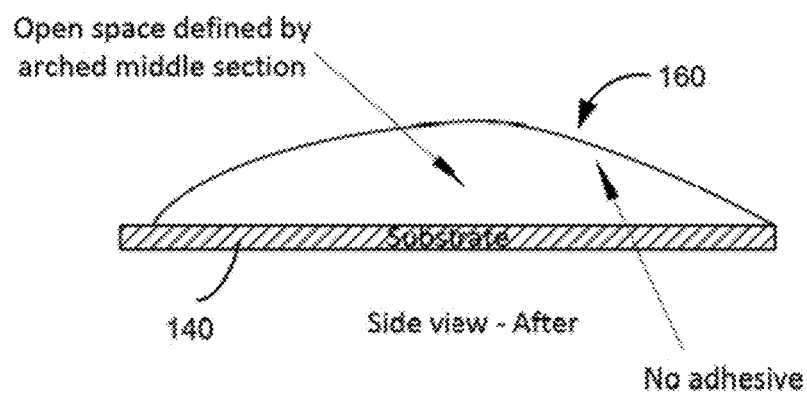

FIGS. 2A and 2B include top and side views of an arched RFID device 200, formed from the substantially flattened RFID device 100 of FIGS. 1A-B after detachment/separation of the middle strip section 120 from the remainder of the sheet 100. As noted, upon detachment of the middle strip section 120 (whether by peeling an outer layer from an adhesive layer, or by tearing the middle strip section 120 along pre-formed perforations), the separated middle strip section 120 is secured to the flanking side strips 130 and 140 to form an arched structure 160. This can be achieved by fitting tabs, such as the tabs 126a and 126b of FIG. 1A, into notches 134 and 144, respectively, defined in the side strips 130 and 140. Alternatively or additionally, the securing of the middle strip section 120 to the side strips 130 and 140 can be achieved through an adhesive-based attachment mechanism in which a cover layer at an area near the tip of the middle strip section 120 is peeled to expose an adhesive that can be attached to attachment points on the side strips 130 and 140.

In some embodiments, producing the initial substantially flattened structure may be implemented by providing pre-fabricated sheets of cuttable materials (e.g., paper-based materials, polymer-based materials, such as polyethylene, etc.), which may be multi-layered sheets with a substrate layer on top of which adhesive material is disposed, and which is covered by a covered layer. Such sheets may be cut (e.g., by a cutting machine) into multiple sections shaped similarly to the sheet structure 110 (e.g., two abutting rectangular pieces, with one rectangular piece being smaller than the other one and extending therefrom). A blade (which may form part of the machine) can also be used to make perforations in each of multiple sections. A placement mechanism can place, print, or otherwise construct the RF circuit, which may be configured at the time of placement to uniquely identify each of the cut multiple pieces. Alternatively, configuring the RF circuits (e.g., to transmit unique identification data in response to receipt of a triggering RF transmission) may be performed at the time that the RFID device (whether prior to formation of the arched structure, or after formation of the arched structure) is deployed for attachment to a target object. The cutting, perforating, and RF circuit placing operations may be performed in sequence or substantially simultaneously. In some embodiments, RFID inlays are cut and inserted into a support structure (e.g., a label, or the strip-based structure, which may be similar to the structures described herein) by a press. The press may also include perf blades, and may be configured to die cuts and separate each label on a roll.

Figure 3:
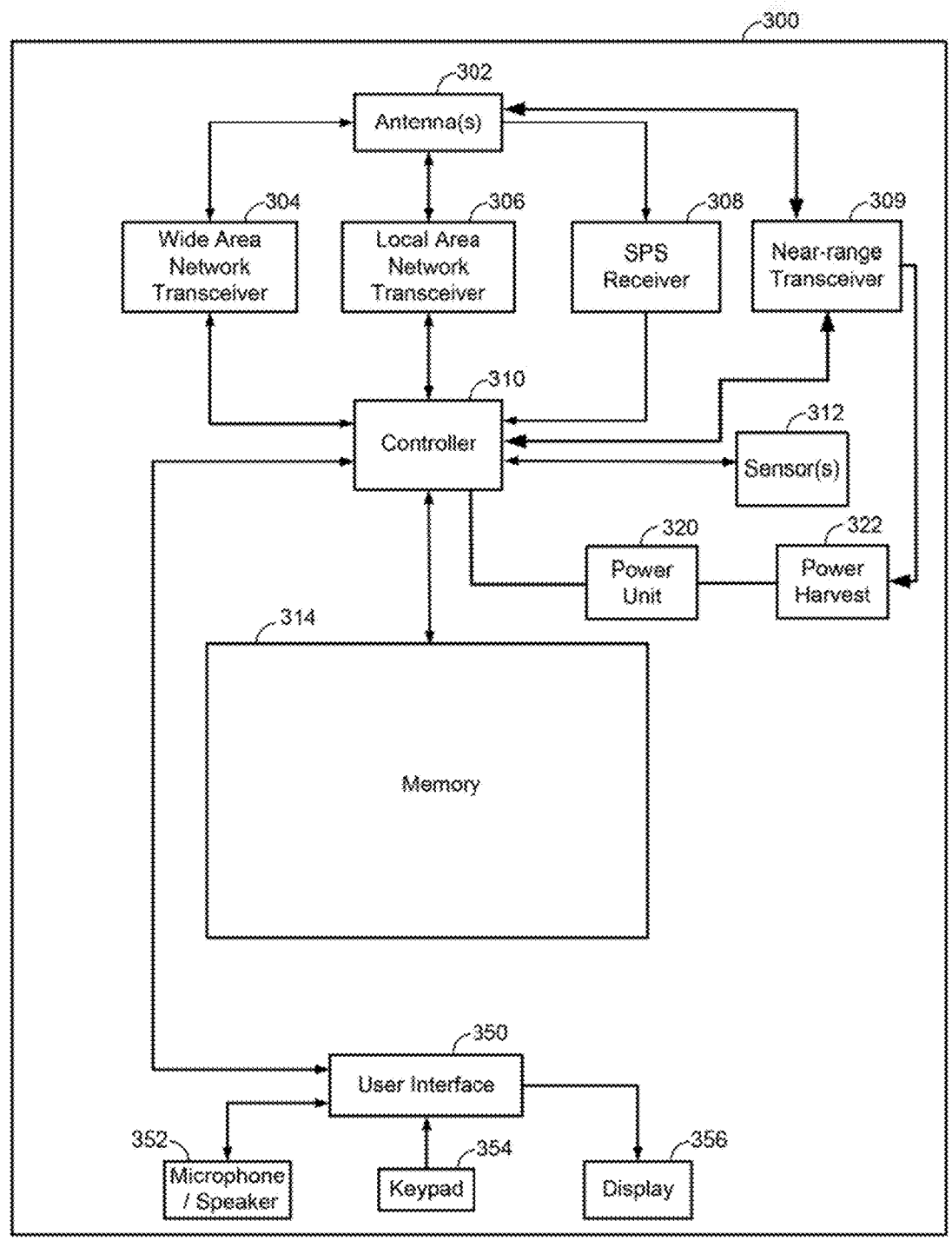
FIG. 3 is a schematic diagram of an example device which may be used in the implementation of any of the devices of FIG. 1A-B, 2A-B, or 4.
Figure 4:
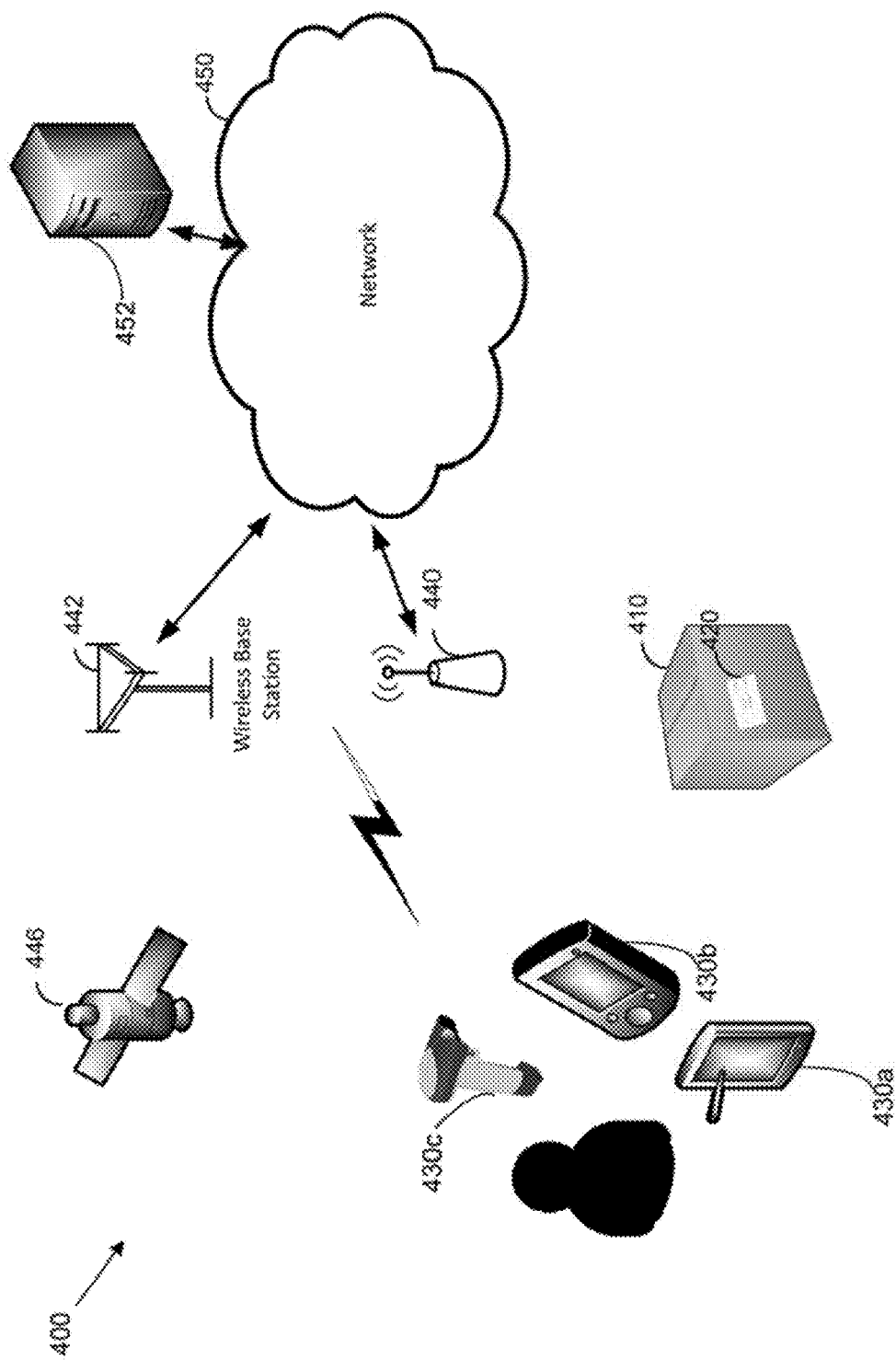
FIG. 4 is a diagram of an example system to communicate, track, and/or interact with RFID devices.

With reference now to FIG. 3, a schematic diagram of an example device 300, which may be used to implement, at least in part, the circuitry and/or functionality of RFID devices 100 and 200 of FIGS. 1A-B and 2A-B, and/or to implement a reader device for communication with RFID devices (such as the reader devices 430a-c of FIG. 4) or any of the other devices/nodes depicted in FIG. 4, is shown. It is to be noted that one or more of the modules and/or functions illustrated in the example of FIG. 3 may be further subdivided, or two or more of the modules or functions illustrated in FIG. 3 may be combined. Additionally, one or more of the modules or functions illustrated in FIG. 3 may be excluded.

As shown, the example device 300 may include one or more transceivers (e.g., a WWAN transceiver 304, a WLAN transceiver 306, a near-range transceiver 309, etc.) that may be connected to one or more antennas 302. Generally, WLAN or WWAN transceivers may be implemented for devices such as an RFID reader that require long-range communication with remote devices (e.g., to configure individual RFID device, or to collect data transmitted by RFID devices to the reader device). However, in some embodiments, RFID devices may also include long-range transceivers. The transceivers 304, and 306, and/or 309 may comprise suitable devices, hardware, and/or software for communicating with and/or detecting signals to/from a network or remote devices, and/or directly with other wireless devices within a network. In some embodiments, by way of example only, the transceiver 306 may support wireless LAN communication (e.g., WLAN, such as WiFi-based communications) to thus cause the device 300 to be part of a WLAN implemented as an IEEE 802.11x network. In some embodiments, the transceiver 304 may support the device 300 to communicate with one or more cellular access points (also referred to as a base station) used in implementations of Wide Area Network Wireless Access Points (WAN-WAP), which may be used for wireless voice and/or data communication. A wireless wide area network (WWAN) may be part of a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards, and a TDMA network may implement Global System for Mobile Communications (GSM), Digital Advanced Mobile Phone System (D-AMPS), or some other RAT.

As noted, the device 300 may also include a near-range transceiver (interface) 309 configured to allow the device 300 to receive and transmit, for example, UHF signals (e.g., in order to effectuate and RFID protocol) or to communicate according to one or more near-range communication protocols, such as, for example, Ultra Wide Band, ZigBee, wireless USB, Bluetooth (classical Bluetooth), Bluetooth Low Energy (BLE) protocol, etc.

As further illustrated in FIG. 3, in some embodiments, an SPS receiver 308 may also be included in the device 300 (e.g., in embodiments in which the device 300 is used to implement an RFID reader device or some network node). The SPS receiver 308 may be connected to the one or more antennas 302 for receiving satellite signals. The SPS receiver 308 may comprise any suitable hardware and/or software for receiving and processing SPS signals. The SPS receiver 308 may request information as appropriate from the other systems, and may perform the computations necessary to determine the device's 300 position using, in part, measurements obtained by any suitable SPS procedure. Such positioning information may be used, for example, to determine the location and motion of an RFID device. Additionally or alternatively, the device 300 may derive positioning information based on signals communicated to and from access points (and/or base stations), e.g., by performing multilateration position determination procedures based on metrics derived from the communicated signals. Such metrics from which the device 300's position may be determined include, for example, timing measurements (using techniques based on round trip time, or RTT, measurements, observed-time-difference-of-arrival, or OTDOA, in which a receiving device measures time differences in received signals from a plurality of network nodes, and so on), signal-strength measurements (e.g., received signal strength indication, or RSSI, measurements, which provide a representation of signal power level of a signal received by an antenna of the receiving device), etc.

In some embodiments, one or more sensors 312 may be coupled to a controller/processor 310 to provide data that includes relative movement and/or orientation information which is independent of motion data derived from signals received by, for example, the transceivers 304, 306, and/or 309, and the SPS receiver 308. By way of example but not limitation, sensors 312 may utilize an accelerometer (e.g., a MEMS device), a gyroscope, a geomagnetic sensor (e.g., a compass), and/or any other type of sensor. Moreover, sensor 312 may include a plurality of different types of devices and combine their outputs in order to provide motion information. The one or more sensors 312 may further include an altimeter (e.g., a barometric pressure altimeter), a thermometer (e.g., a thermistor), an audio sensor (e.g., a microphone), a camera or some other type of optical sensors (e.g., a charge-couple device (CCD)-type camera, a CMOS-based image sensor, etc., which may produce still or moving images that may be displayed on a user interface device, and that may be further used to determine an ambient level of illumination and/or information related to colors and existence and levels of UV and/or infra-red illumination), and/or other types of sensors.

With continued reference to FIG. 3, the device 300 may include a power unit 320 such as a battery and/or a power conversion module that receives and regulates power from an outside source (e.g., AC power, in situations where the device 300 implements, for example, an RFID reader device or a network node). As discussed herein, in some embodiments, e.g., when the device 300 is used to implement an RFID device which may not have readily available access to replaceable power (e.g., batteries) or AC power, the power source 320 may be connected to a power harvest unit 322. The power harvest unit 322 may be configured to receive RF communications, and harvest the energy of the received electromagnetic transmissions (although FIG. 3 illustrates the unit 322 receiving RF communication via the near-range interface 309, the power harvest unit 322 may be connected to, and receive RF energy from, any of the other communication interfaces depicted in FIG. 3). As noted, an RF harvest unit generally includes an antenna element coupled to an RF-to-DC conversion circuit (e.g., an RF-to-DC rectifier). Resultant DC current may be further conditioned (e.g., through further filtering and/or down-conversion operation to a lower voltage level), and provided to a storage device realized, for example, on the power unit 320 (e.g., capacitor(s), a battery, etc.)

The controller 310 may be connected to the transceivers 304, 306, 309, the SPS receiver 308, the sensors 312, and the power unit 320. The controller may include one or more microprocessors, microcontrollers, and/or digital signal processors that provide processing functions, as well as other calculation and control functionality. The processor 310 may also include memory 314 for storing data and software instructions for executing programmed functionality within the device. The functionality implemented via software may depend on the particular device at which the memory 314 is housed, and the particular configuration of the device and/or the devices with which it is to communicate. For example, if the device 300 is used to implement an RFID device (such as the RFID device 100 or 200) with limited power availability, the device may be configured (via software modules/applications provided on the memory 314) to implement a process to receive and process RF signals, and when the RF signals correspond to some pre-determined trigger signal, to transmit data (identification data, sensor data, etc.) that was pre-stored in the memory 314 and/or collected by one or more sensors.

The example device 300 may further include a user interface 350 which provides any suitable interface systems, such as a microphone/speaker 352, keypad 354, and display 356 that allows user interaction with the mobile device 300. Such a user interface may be an audiovisual interface (e.g., a display and speakers) of an RFID reader device, a smartphone device, a tablet-based device, or some other type of interface (visual-only, audio-only, tactile, etc.), configured to provide status data, alert data, and so on, to a user using the particular device 300 (e.g., an administrator, etc.) The microphone/speaker 352 provides for voice communication functionality, the keypad 354 includes suitable buttons for user input, the display 356 includes any suitable display, such as, for example, a backlit LCD display, and may further include a touch screen display for additional user input modes. In some embodiments, the display 356 may be a bi-state display configured to maintain (i.e., without requiring on-going supply of energy) the display of particular data (e.g., characters and/or graphics) until the state (i.e., the data) for the bi-state display is changed/updated again. Further details regarding use of a bi-state display for some implementations of the device 300 are provided, for example, in U.S. Pat. No. 8,616,457, entitled "RFID display label for battery packs," the content of which is incorporated herein by reference in its entirety. The microphone/speaker 352 may also include or be coupled to a speech synthesizer (e.g., a text-to-speech module) that can convert text data to audio speech so that the user can receive audio notifications. Such a speech synthesizer may be a separate module, or may be integrally coupled to the microphone/speaker 352 or to the controller 310 of the device of FIG. 3.

With reference next to FIG. 4, a diagram of an example system 400 to communicate with, track, and/or otherwise interact with RFID devices, is shown. The system 400 includes at least one RFID device 420 (not necessarily drawn to scale), which may be similar to the RFID devices 100 or 200 of FIG. 1A-B or 2A-B, deployed in its arched configuration, on an asset 410 (e.g., a box in the example of FIG. 4; other types of objects, including persons, may be tracked using the device 420). As discussed herein, the RFID device 420 may be an active or passive device, and may include a power source (battery or a power harvester), a communication module, and a controller (processor-based).

In some embodiments, the RFID device 420 may also include one or more sensors, including, inertial sensors, such as an accelerometer, gyroscope, magnetometer, etc., environmental condition sensors, RF sensors, etc.

As further depicted in FIG. 4, interaction with the RFID device 420 may be achieved through an RFID reader device, which may be implemented using, for example, a tablet-type device 430a, a PDA device (including a smartphone device) 430b, a scanner device 430c, or any other device equipped with wireless communication modules that can establish a communication channel (e.g., via a UHF band or some other RF band) according to one or more protocols (standard protocols, such as Bluetooth, Bluetooth Low Energy, etc., or proprietary protocols). The RFID reader device 430a-c may each be configured to send a transmission to the RFID device 420 (and other such RFID devices) to trigger a reply transmission (e.g., upon determination, at the RFID device 420 that a trigger signal was received) that can be received by the transmitting RFID reader device. The reply signal may include identification information and/or other data (e.g., sensor data, location data, etc.) The RFID reader devices 430a, 430b, and/or 430c may themselves be in communication with any type of remote network node, including WLAN nodes, such as WLAN node 440, one or more WWAN nodes, such as the WWAN node 442, one or more wireless personal area network (WPAN, such as a Bluetooth network, an IEEE 802.15x, RFID-based networks, other near-field communication networks, etc.) In some embodiments, 4G networks, 5G networks, Long Term Evolution ("LTE") networks, Advanced LTE networks, Ultra Mobile Broadband (UMB) networks, and all other types of cellular and/or wireless communications networks may also be implemented and used with the systems, methods, and other implementations described herein. The RFID reader device may also be implemented to configure the RFID device 420 to operate in some pre-determined (e.g., programmable) manner, including to configure the RFID device 420 to transmit a signal with some particular identification data (which may have been generated by the configuring RFID reader device, or which may have been generated or provided from a remote node to the configuring RFID reader device).

The example system 400 of FIG. 4 may further include a server 452 (e.g., a location server, such as an Evolved Serving Mobile Location Center (E-SMLC) server, a security administrator server to track and monitor assets or persons, or any other type of server) configured to communicate, via a network 450 (which may be a packet-based network, such as the public Internet), or via wireless transceivers included with the server 452, with multiple network elements or nodes, and/or mobile wireless devices.

Figure 5:
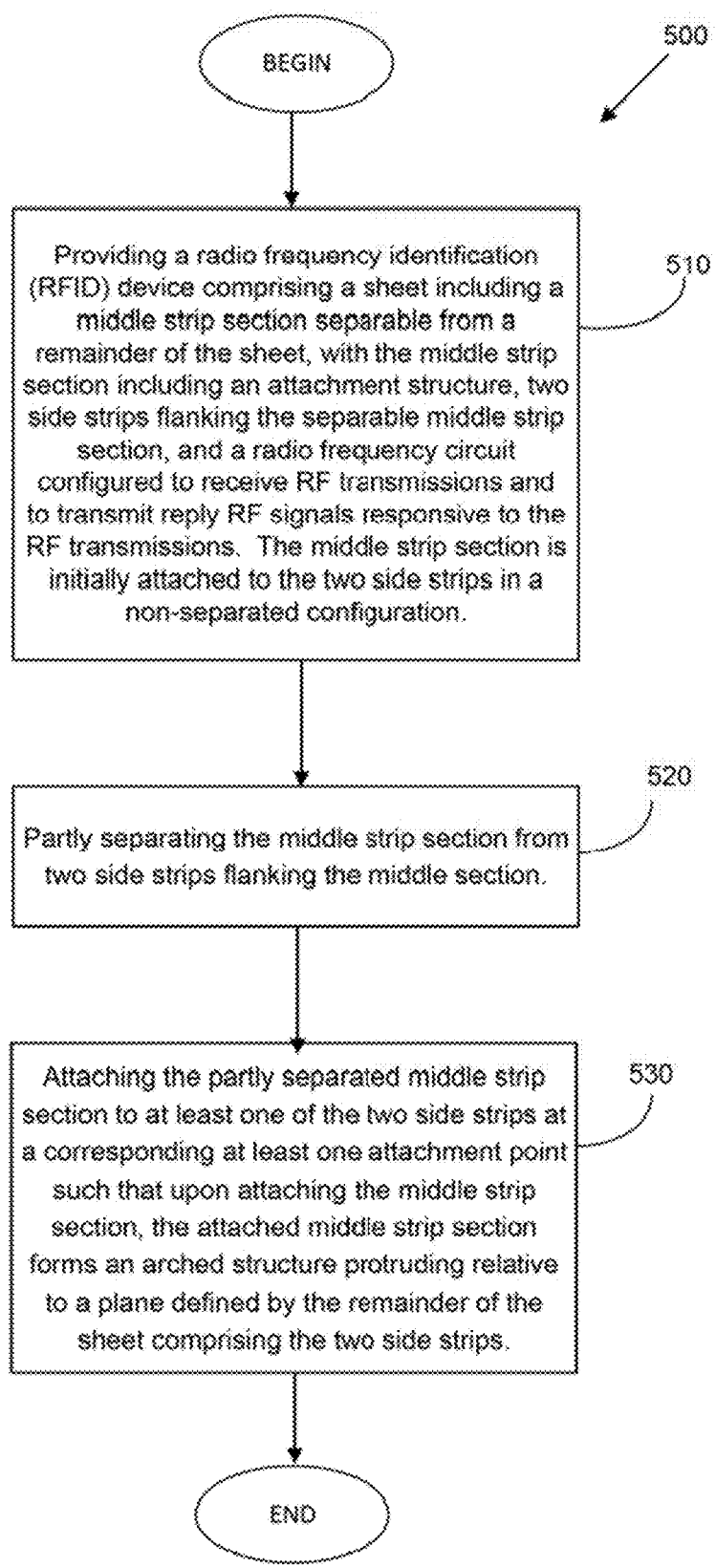
FIG. 5 is a flowchart of an example procedure to configure/structure an arched RFID device.

With reference now to FIG. 5, a flowchart of an example procedure 500 to configure/structure an arched RFID device (such as the device 200 of FIGS. 2A-B configured from the device 100 of FIGS. 1A-B) is shown. The procedure 500 includes providing 510 a radio frequency identification (RFID) device comprising a sheet (e.g., the sheet 110 illustrated in FIG. 1A) including a middle strip section (e.g., the middle strip section 120 of FIGS. 1A and 2a) separable from a remainder of the sheet, with the middle strip section including an attachment structure (e.g., tabs receivable inside notches, or an adhesive-based attachment structure), two side strips flanking the separable middle strip section, and a radio frequency circuit configured to receive RF transmissions and to transmit reply RF signals responsive to the RF transmissions. The middle strip section is initially attached to the two side strips in a non-separated configuration. In some embodiments, the middle strip section is attached to the two side strips, in the non-separated configuration, at perforated edges separating different length sides of the middle strip section from respective length sides of the two side strips. In some embodiments, the radio frequency circuit may include a communication module to receive and transmit RFID communications, a controller to process received data and transmitted data, and a power harvester to inductively generate electrical current or voltage from at least the received RFID communications to power at least the communication module and the controller.

With continued reference to FIG. 5, the procedure 500 further includes partly separating 520 the middle strip section from two side strips flanking the middle strip section. In some implementations, the middle strip section may be disposed in the non-separated configuration on an adhesive section of a substrate layer, and partly separating the middle strip section from two side strips may include peeling the middle strip section from the adhesive section of the substrate layer.

The procedure 500 additionally includes attaching 530 the partly separated middle strip section to at least one of the two side strips at a corresponding at least one attachment point such that upon attaching the middle strip section, the attached middle strip section forms an arched structure protruding relative to a plane defined by the remainder of the sheet comprising the two side strips.

In some implementations, when forming the arched structure, the RF antenna (defined by the arched middle strip section) should be kept from becoming too bowed as that may change its responsiveness (e.g., at frequencies of about 915 MHz). For example, too much bowing may effectively shorten the antenna electrically, shifting its center frequency up. Near metal, a bow shape can be more useful than, for example, a flag shape because it will provide most of the dipole antenna length away from the metal without protruding away from the asset. This bow/arch RFID structure may also result in a greater antenna size for improved range. In addition, a user can also use the same label material for metal and non-metal assets (bowed out or not) which reduces the number of label types required. For example, when attaching an RFID device to a metal-based asset, the bow/arched structure may be formed out of the flattened RFID device, whereas when attaching an RFID device (such as the device 100) to a non-metal asset, it may not be necessary to form the bow/arched device configuration from the flattened (unformed) RFID device 100.

In some embodiments, the middle strip section may be of a length longer than respective lengths of the two side strips, and the middle strip section may include an end portion protruding past end portions of the two side strips when the middle strip is in a non-separated configuration. In such embodiments, attaching the partly separated middle strip section to the at least one of the two side strips may include attaching one or more tabs extending transversely from the end portion of the middle strip section to the at least one of the two side strips at the corresponding at least one attachment point. At least the one or more tabs may include adhesive layers configured to adhere to the corresponding at least one attachment point on the at least one of the two side strips. In some embodiments, attaching the partly separated middle strip section to the at least one of the two side strips at the corresponding at least one attachment point may include receiving at one or more notches located at the at least one of the two side strips the one or more tabs of the middle strip section.

In some embodiments, the procedure 500 may further include attaching the RFID device to another object. Attaching the RFID device to the other object may include exposing at least one adhesive layer covering at least one underside surface of at least one of the two side strips, and securing the exposed at least adhesive layer to a surface of the other object. Attaching the RFID device to the other object may include placing the at least two side strips in a receiving structure mountable on the other object.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of +20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A radio frequency identification (RFID) device, comprising:
    a sheet comprising:
        a middle strip section separable from a remainder of the sheet, the middle strip section including an attachment structure; and
        two side strips flanking the separable middle strip section; and
    a radio frequency circuit configured to receive RF transmissions and to transmit reply RF signals responsive to the RF transmissions;
    wherein the middle strip section is initially attached to the two side strips in a non-separated configuration, and is configured to be partly separated from the two side strips flanking the middle strip section, and to be attached to at least one of the two side strips at a corresponding at least one attachment point such that the middle strip section, when attached, protrudes relative to a plane defined by the remainder of the sheet comprising the two side strips to form an arched structure;
    and wherein the middle strip section is of a length longer than respective lengths of the two side strips, wherein the middle strip section comprises an end portion protruding past end portions of the two side strips when the middle strip is in the non-separated configuration, and wherein the attachment structure comprises one or more tabs extending transversely from the end portion of the middle strip section with the one or more tabs configured to be secured to the at least one of the two side strips at corresponding at least one attachment point when the middle strip section is partly separated from the two side strips.

2. The RFID device of claim 1, wherein the one or more tabs include adhesive layers configured to adhere to the corresponding at least one attachment point on the at least one of the two side strips.

3. The RFID device of claim 1, wherein the at least one attachments point comprises one or more notches to securely receive the one or more tabs of the middle strip section.

4. The RFID device of claim 1, wherein the middle strip section is attached to the two side strips, in the non-separated configuration, at perforated edges separating different length sides of the middle strip section from respective length sides of the two side strips.

5. The RFID device of claim 1, wherein the middle strip section is disposed in the non-separated configuration on an adhesive section of a substrate layer, with the middle strip section configured to be peeled when separated from the two side strips.

6. The RFID device of claim 1, further comprising:
    an attachment mechanism configured to couple the RFID device to an other object.

7. The RFID device of claim 6, wherein the attachment mechanism comprises at least one adhesive layer covering at least one underside surface of at least one of the two side strips.

8. The RFID device of claim 6, wherein the attachment mechanism comprises a receiving structure mountable on the other object, the receiving structure configured to securely receive at least the two side strips.

9. The RFID device of claim 1, wherein the radio frequency circuit comprises:
    a communication module to receive and transmit RFID communications, a controller to process received data and transmitted data, and a power harvester to inductively generate electrical current or voltage from at least the received RFID communications to power at least the communication module and the controller.

10. A method comprising:
    providing a radio frequency identification (RFID) device comprising a sheet including a middle strip section separable from a remainder of the sheet with the middle strip section including an attachment structure, two side strips flanking the separable middle strip section, and a radio frequency circuit configured to receive RF transmissions and to transmit reply RF signals responsive to the RF transmissions, wherein the middle strip section is initially attached to the two side strips in a non-separated configuration;
    partly separating the middle strip section from two side strips flanking the middle strip section; and attaching the partly separated middle strip section to at least one of the two side strips at a corresponding at least one attachment point such that upon attaching the middle strip section, the attached middle strip section forms an arched structure protruding relative to a plane defined by the remainder of the sheet comprising the two side strips;

wherein the middle strip section is of a length longer than respective lengths of the two side strips, wherein the middle strip section comprises an end portion protruding past end portions of the two side strips when the middle strip is in a non-separated configuration, and wherein attaching the partly separated middle strip section to the at least one of the two side strips comprises attaching one or more tabs extending transversely from the end portion of the middle strip section to the at least one of the two side strips at the corresponding at least one attachment point.

11. The method of claim 10, wherein at least the one or more tabs include adhesive layers configured to adhere to the corresponding at least one attachment point on the at least one of the two side strips.

12. The method of claim 10, wherein attaching the partly separated middle strip section to the at least one of the two side strips at the corresponding at least one attachment point comprises:

receiving at one or more notches located at the at least one of the two side strips the one or more tabs of the middle strip section.

13. The method of claim 10, wherein the middle strip section is attached to the two side strips, in the non-separated configuration, at perforated edges separating different length sides of the middle strip section from respective length sides of the two side strips.

14. The method of claim 10, wherein the middle strip section is disposed in the non-separated configuration on an adhesive section of a substrate layer, and wherein partly separating the middle strip section from two side strips comprises:

peeling the middle strip section from the adhesive section of the substrate layer.

15. The method of claim 1, further comprising:
attaching the RFID device to an other object.

16. The method of claim 15, wherein attaching the RFID device to the other object comprises:

exposing at least one adhesive layer covering at least one underside surface of at least one of the two side strips; and securing the exposed at least adhesive layer to a surface of the other object.

17. The method of claim 15, wherein attaching the RFID device to the other object comprises:

placing at least the two side strips in a receiving structure mountable on the other object.

18. The method of claim 10, wherein the radio frequency circuit comprises:

a communication module to receive and transmit RFID communications, a controller to process received data and transmitted data, and a power harvester to inductively generate electrical current or voltage from at least the received RFID communications to power at least the communication module and the controller.

* * * * *